United States Patent Office 3,681,135
Patented Aug. 1, 1972

3,681,135
PRINTED CIRCUITS AND METHOD OF MAKING SAME
Walter Graham Cheary, Hall Green, England, assignor to Joseph Lucas (Industries) Limited, Birmingham, England
No Drawing. Continuation-in-part of application Ser. No. 682,608, Nov. 13, 1967. This application June 24, 1970, Ser. No. 49,532
Int. Cl. H05k 1/00
U.S. Cl. 117—212
9 Claims

ABSTRACT OF THE DISCLOSURE

Electrical printed circuits formed by applying to an alumina substrate a conductive ink comprising a mixture of approximately 5% by weight of titanium hydride, 10% by weight of lead, with the remainder being a mixture of copper and gold, the copper ranging between 50% and 80% by weight of the whole ink mix and the gold ranging between 5% and 20% by weight of the whole ink mix, and an organic binder, and firing said conductive ink onto said substrate.

---

This application is a continuation-in-part of application Ser. No. 682,608 filed Nov. 13, 1967, now abandoned.

The invention relates to printed circuits and methods of making same wherein a conductive ink mixture of particular composition is applied as by screen printing to an alumina substrate and fired.

The basic object of the invention is to provide electrical printed circuits wherein the conductive ink forming the electrical circuit adheres to the substrate in a manner much better than with prior art materials and without spreading on firing and a method of making such printed circuits which is simple and yet efficient.

In accordance with the present invention an electrically conductive ink suitable for application by firing to a ceramic body, preferably a 96% alumina substrate, comprises a mixture of approximately 5% by weight of titanium hydride, predominantly $TiH_2$, 10% by weight of lead, with the remainder being a mixture of copper and gold, the copper ranging between 50% and 80% by weight of the whole ink mixture and the gold ranging between 5% and 20% by weight of the whole ink mixture, the foregoing being formed into a paste with a suitable organic binder.

The following specific example illustrates the instant inventive concepts:

EXAMPLE

According to the present invention, a composition suitable for the production of high adhesion printed circuits is as follows:

5% by weight titanium hydride
10% by weight lead
70% by weight copper
15% by weight gold The above powdered metals are dispersed in an 8% solution of ethyl cellulose in beta-terpineol, to give typically a viscosity between 40,000 to 60,000 centipoises measured at 20° C. using a Brookfield Viscometer and spindle number 7 at a speed of 10 revolutions per minute.

The resultant paste is applied by any conventional printing process, such as screen printing, in selected electrically conductive paths, preferably narrow electrically conductive strips, onto the ceramic substrate, preferably a high alumina (96%) ceramic material, and then fired in an argon atmosphere at a temperature between 900° C. and 1200° C. The firing serves to remove the organic fraction of the ink and to promote the high level of adhesion between the conducting paths and the alumina substrates.

The conductivity values of the fired ink patterns are typically 10 milliohms per square, and electrical connection to external electrical components may be made after gold plating, by either direct welding or welding of wires.

A variety of tests indicated that a level of adhesion of the fired ink paths to an alumina substrate, was achieved which was at least an order of magnitude higher than any precious metal-glass ink of comparable electrical conductivity.

The high adhesion of the ink described in this application is promoted by the decomposition of the titanium hydride, migration of the decomposition product so formed downwards through the ink, and its reaction with the alumina substrate, all of which occur during the firing cycle. Commercially available titanium hydride contains a mixture of $TiH$, $TiH_2$, $TiH_4$ and $Ti_3H_5$. However, some of these compounds are unstable and cannot exist for any length of time. Thus, the titanium hydride can be said to be predominantly $TiH_2$, since this is the formula which most of the substance will have.

The concentration of lead in the ink paste is critical. Sufficient has to be added to promote local alloying of the copper and the gold, but not too much so as to cause excessive spreading of the conducting paths during firing. Approximately 10% by weight of the ink mixture is suitable.

The organic binder is lost during drying and firing, and is chosen and is used in such concentrations, so that the viscosity of the ink paste is at an optimum with respect to the screen printing application, and that the very minimum of organic residues are left in the final conducting paths. Approximately 13% by weight of the whole ink mixture of the foregoing 8% solution of ethyl cellulose in beta-terpineol is suitable, although other organic binders may be substituted therefor.

As indicated, adhesion to the ceramic body is provided by the titanium which acts as a flux and the lead assists in the local alloying between the particles of copper and the gold, which, however, are not intended fully to alloy together. Suitable control of the temperature ensures that the particles adhere firmly together without fully alloying. The copper is the conductor and the gold is required for making connections by welding gold wires.

In the example, the proportions of copper to gold may be varied, the copper ranging approximately between 50% and 80% by weight of the whole ink mixture which includes the titanium hydride, the lead, the copper and the gold, and the gold ranging between approximately 5% and 20% by weight of the whole ink mixture.

The particular pattern of the resultant printed circuit can be varied at will, the ink mixture being applied to the ceramic tile in the predetermined electrically conductive paths.

What is claimed is:

1. A printed circuit comprising a high alumina ceramic tile having an electric circuit printed in electrically conductive paths and fired thereon at a temperature of from about 900° to 1200° C. in an argon atmosphere, said electrically conductive paths being formed of an electrically conducting ink comprising approximately 5% by weight of titanium hydride, approximately 10% by weight of lead, the remainder being a mixture of copper and gold, the copper ranging between approximately 50% and 80% by weight of the whole ink mixture and the gold ranging between approximately 5% and 20% of the whole ink mixture.

2. The printed circuit of claim 1 wherein said ceramic tile comprises 96% alumina.

3. The printed circuit of claim 1 wherein said electrically conductive ink consists of 5% by weight titanium hydride, 10% by weight lead, 70% by weight copper and 15% by weight gold.

4. The printed circuit of claim 1, further including electrically connecting means operatively secured to said electrically conductive paths.

5. A method of forming printed circuits comprising applying in electrically conductive paths to a high alumina ceramic tile an electrically conductive ink comprising approximately 5% by weight of titanium hydride, approximately 10% by weight lead, the remainder being a mixture of copper and gold, the copper ranging between approximately 50% and 80% by weight of the whole ink mixture and the gold ranging between approximately 5% and 20% by weight of the whole ink mixture, said electrically conductive ink being formed into a paste with an organic binder, and firing said electrically conductive ink to said ceramic tile at a temperature of from about 900° to 1200° C.

6. The method of claim 5 wherein said ceramic tile comprises 96% alumina.

7. The method of claim 5 wherein said electrically conductive ink consists of 5% by weight titanium hydride, 10% by weight lead, 70% by weight copper and 15% by weight gold.

8. The method of claim 5 further including the step of securing electrical connecting means to said electrically conductive paths after said firing.

9. The method of claim 5 wherein said organic binder is an 8% solution of ethyl cellulose in beta-terpineol.

References Cited
UNITED STATES PATENTS

| | | | |
|---|---|---|---|
| 3,001,269 | 9/1961 | Moore et al. | 29—195 X |
| 3,137,545 | 6/1964 | Schultz, Jr. | 29—195 |
| 3,293,501 | 12/1966 | Martin | 252—514 X |
| 3,153,600 | 10/1964 | Feuillade et al. | 252—514 X |
| 3,407,081 | 10/1968 | Ballard | 117—227 X |
| 2,570,248 | 10/1951 | Kelley | 29—195 X |
| 3,152,871 | 10/1964 | Matchen | 29—195 |

RALPH S. KENDALL, Primary Examiner

U.S. Cl. X.R.

106—1; 117—221, 227